(12) United States Patent
Lee

(10) Patent No.: US 11,810,720 B2
(45) Date of Patent: Nov. 7, 2023

(54) METHOD FOR FABRICATING TERMINAL ELECTRODE OF MULTILAYER CERAMIC CAPACITOR HAVING INNER ELECTRODES PRINTED ON FULL AREA TOGETHER WITH PROTECTIVE LAYERS

(71) Applicant: National Cheng Kung University, Tainan (TW)

(72) Inventor: Wen-Hsi Lee, Tainan (TW)

(73) Assignee: National Cheng Kung University, Tainan (TW)

( * ) Notice: Subject to any disclaimer, the term of this patent is extended or adjusted under 35 U.S.C. 154(b) by 32 days.

(21) Appl. No.: 17/402,767

(22) Filed: Aug. 16, 2021

(65) Prior Publication Data

US 2022/0406529 A1    Dec. 22, 2022

(30) Foreign Application Priority Data

Jun. 16, 2021    (TW) .................. 110121953

(51) Int. Cl.

| | |
|---|---|
| *H01G 4/232* | (2006.01) |
| *C25D 3/38* | (2006.01) |
| *C25D 5/50* | (2006.01) |
| *C25D 7/00* | (2006.01) |
| *H01G 4/012* | (2006.01) |
| *H01G 4/30* | (2006.01) |
| *C23C 18/54* | (2006.01) |

(52) U.S. Cl.
CPC ........... *H01G 4/2325* (2013.01); *C23C 18/54* (2013.01); *C25D 3/38* (2013.01); *C25D 5/50* (2013.01); *C25D 7/00* (2013.01); *H01G 4/012* (2013.01); *H01G 4/30* (2013.01)

(58) Field of Classification Search
CPC ........ C23C 18/54; C25D 7/00; H01G 13/006; H01G 4/12; H01G 4/2325
See application file for complete search history.

(56) References Cited

U.S. PATENT DOCUMENTS

| | | | |
|---|---|---|---|
| 2008/0123248 A1 | 5/2008 | Kunishi et al. | |
| 2018/0174720 A1* | 6/2018 | Lee | ........... H01C 17/281 |
| 2022/0406529 A1* | 12/2022 | Lee | ............. C23C 18/54 |

FOREIGN PATENT DOCUMENTS

| | | |
|---|---|---|
| JP | 2010093113 A | 4/2010 |
| JP | 2012209540 A | 10/2012 |
| JP | 2020057738 A | 4/2020 |
| KR | 10-2014-0014773 A | 2/2014 |
| KR | 10-2018-0113896 A | 10/2018 |
| KR | 10-2019-0139234 A | 12/2019 |
| KR | 10-2020-0023925 A | 3/2020 |

* cited by examiner

*Primary Examiner* — Minh N Trinh
(74) *Attorney, Agent, or Firm* — Demian K. Jackson; Jackson IPG PLLC

(57) ABSTRACT

A method is provided for fabricating a terminal electrode. The terminal electrode is applied on a multilayer ceramic capacitor (MLCC). The method prints inner electrodes on full area together with protective layers. The MLCC uses the thickness of thinned dielectric ceramic layers and the stacking of nickel inner-electrode layers. High capacitance is achieved at ends and sides with high electrode-to-ceramic ratios. Thus, the present invention uses a coating technology of ultra-low-temperature electrochemical deposition to fabricate low internal-stress MLCC terminal electrodes together with insulating protective layers for improving MLCC yield while cost reduced.

7 Claims, 13 Drawing Sheets

METHOD FOR FABRICATING TERMINAL ELECTRODE OF MULTILAYER CERAMIC CAPACITOR HAVING INNER ELECTRODES PRINTED ON FULL AREA TOGETHER WITH PROTECTIVE LAYERS

TECHNICAL FIELD OF THE INVENTION

The present invention relates to fabricating a terminal electrode of a multilayer ceramic capacitor (MLCC) having inner electrodes; more particularly, to using electrochemical deposition to fabricate terminal electrodes and insulating protective layers of a low internal-stress MLCC for improving MLCC yield with cost reduced.

DESCRIPTION OF THE RELATED ARTS

FIG. 10 shows a structure having low-density nickel (Ni) inner electrodes at ends and sides. Table 3 shows the principles and methods of making a terminal electrode of a traditional low-Ni-density MLCC. Therein, the terminal electrode of the traditional MLCC 5 is made by using a thick-film copper (Cu) paste containing glass; immersion plating is used to form the terminal electrode; and a heat treatment of sintering is processed at a high temperature (800~900 degrees Celsius (° C.)) under the protection of a nitrogen atmosphere to form a Cu terminal electrode 53; the Cu and Ni inner electrodes 52 are used to form an alloy ohmic contact connected with the inner electrodes 52 in parallel for achieving low loss and high capacitance; and the glass in the Cu paste is used to connect dielectric ceramic 51 and the Cu terminal electrode 53.

TABLE 3

| | | Traditional MLCC terminal electrode |
|---|---|---|
| Mechanism | Principle | Non-uniform connection (joining) |
| | Method | Connecting outer Cu electrode to NI inner electrode |
| Function | Ohmic contact | Cu/Ni alloy |
| | Brick combined | Combining glass with brick through outer Cu electrode |
| Material | Organic | Adhesive + solvent |
| | Non-organic | Metal Cu powder + glass |
| Process | Forming | Immersion plating |
| | Heat treatment | Sintering (800~900° C. under nitrogen) |
| Feature | Appearance | Five sides |
| | Physical feature | High stress, low density |
| | Reliability | Low thermal-cycle resistance |

As shown in Table 3, the prior art uses a thick-film conductive Cu paste, where, after a forming process of immersion plating following by a heat treatment at 750~900° C. for about 1 hour (hr) in a nitrogen reduction atmosphere, a Cu terminal electrode 32 of the MLCC is formed through sintering. However, during the fabrication of the MLCC terminal electrode in the high-temperature reduction atmosphere, the high-temperature heat treatment makes the MLCC release high internal stress as resulting in serious device cracks and defects.

Furthermore, for obtaining the high capacitance of the MLCC 5, not only the thickness of the dielectric ceramic 51 between every two of the inner electrodes 52 is reduced; but also more layers of the inner electrodes 52 must be stacked at the same time. However, it is easy to make the density of the electrode in the middle much higher than that on sides of the dielectric ceramic 51. After a further high-temperature sintering, the so-called breading effect is easily formed as shown in FIG. 11. The MLCC has bumps on top and bottom. Regarding solution to the fabrication of high-capacitance MLCC as causing a great difference of electrode density between its middle and ends owing to the stacking of the thinned dielectric layers and the inner electrodes, the prior art prints additional electrodes on sides to reduce the density difference between its middle and ends. Another method is to make additional high-temperature insulating ceramic protective layers on sides. It requires to print additional insulating ceramic layers, and, then, process sintering under a protective ultra-high-temperature reduction atmosphere for making the MLCC and the protecting layers be closely combined. Accordingly, the above methods make up the thickness for the Ni-inner-electrode layers. However, the MLCC is fabricated with additional high-temperature protective insulating ceramic layers, where the high-temperature heat treatment will make the MLCC release high internal stress as resulting in serious device cracks and defects.

In summary, the traditional MLCC is fabricated through sintering in a high-temperature reduction atmosphere and the high-capacitance MLCC obtained after being sintered has the breading effect owing to the density difference between the inner-electrode stack in middle and the electrode-excluded dielectric ceramic layers on sides. The quality concerning internal stress caused by high-capacitance MLCC is a big challenge. Therefore, it is extremely necessary to develop a technology for ultra-low-temperature terminal electrode.

Hence, the prior arts do not fulfill all users' requests on actual use.

SUMMARY OF THE INVENTION

The main purpose of the present invention is to use a coating technology of ultra-low-temperature electrochemical deposition to fabricate terminal electrodes and insulating protective layers of a low internal-stress MLCC for improving MLCC yield with cost reduced.

To achieve the above purposes, the present invention is a method for fabricating a terminal electrode of an MLCC having inner electrodes printed on full area together with protective layers, comprising steps of: (a) obtaining a sintered MLCC containing no terminal electrode by inter-stacking a plurality of thinned dielectric ceramic layers and a plurality of inner electrodes, and printing the inner electrodes on full area of the MLCC with high density of the inner electrodes obtained at ends of the MLCC; (b) processing plating of wet chemical immersion by immersing the MLCC in a metal solution at a temperature below 80° C., to, through electrochemical deposition, start slowly growing a metal coating on surfaces of the inner electrodes; and (c) after processing immersion for 1~2 hours, growing the metal coating on the surfaces of the inner electrodes continuously to be connected together to obtain metal-plated terminal electrodes with connecting surfaces at the ends of the MLCC. Accordingly, a novel method for fabricating a terminal electrode of an MLCC having inner electrodes printed on full area together with protective layers is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
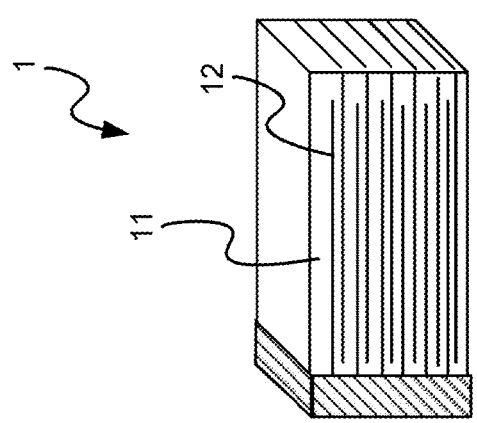
FIG. 1 is the view showing the high-density Ni inner electrodes at ends and sides.

Please refer to FIG. 1 to FIG. 9, which are a view showing high-density Ni inner electrodes at ends and sides; a comparative view showing the reduction potentials of MLCCs; a view showing the fabrication of a terminal electrode; a view showing a Cu terminal electrode obtained by displacing high-density Ni electrodes; a view showing the microstructure of a Cu terminal electrode obtained after deposition; a view showing the microstructure and material of a Cu terminal electrode obtained during deposition; a view showing a Cu terminal electrode obtained through conversion after immersing an MLCC in a low-temperature copper sulfate solution; a view showing the microstructures of a Cu terminal electrode obtained through gradual conversion for a period of 20 min to 2 hrs after immersing an MLCC in a low-temperature copper sulfate solution; a view showing the conversion of low-temperature Al terminal electrodes into a Cu terminal electrode through chemical redox displacement; a view showing the fabrication of insulating protective layers; and a view showing the microstructure of a novel MLCC. As shown in the figures, the present invention is a method for fabricating a terminal electrode of an MLCC having inner electrodes printed on full area together with protective layers, where an MLCC 1 is applied to use the thickness of thinned dielectric ceramic layer 11 and the stacking of plural layers of Ni inner electrodes 12 to fabricate ends and sides having high-density electrode-to-ceramic ratios for achieving high capacitance as shown in FIG. 1.

Figure 2:
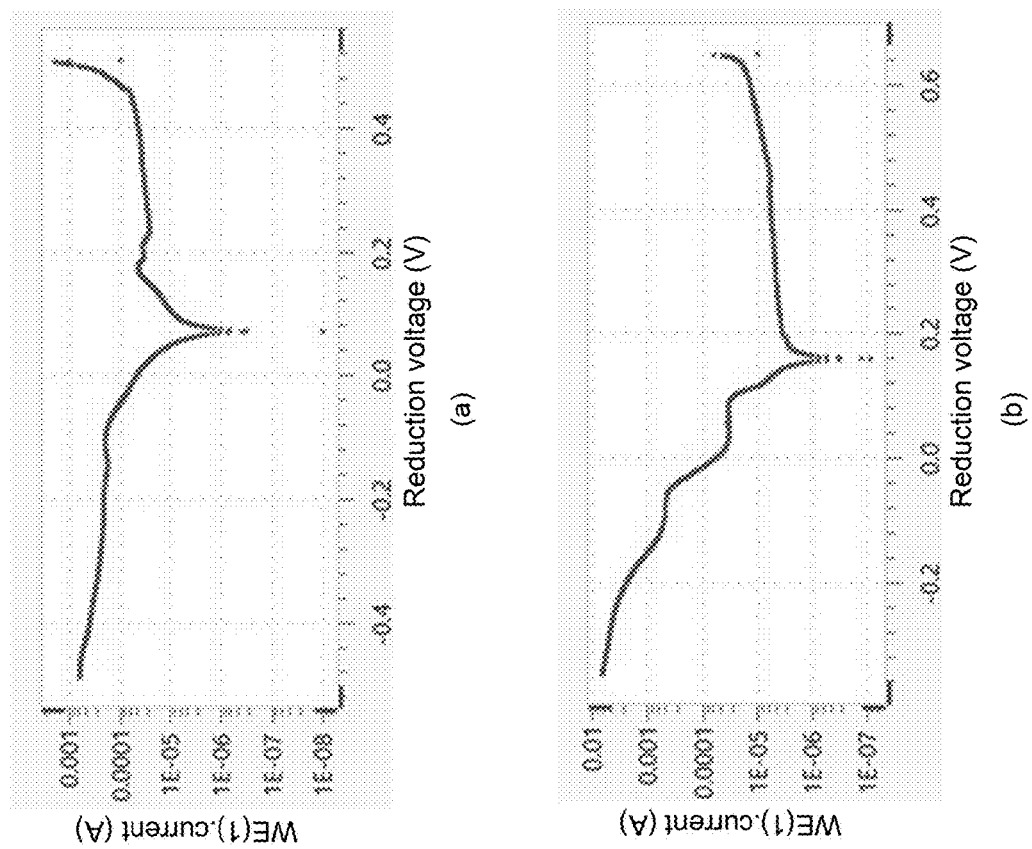
FIG. 2 is the comparative view showing the reduction potentials of the multi-layer ceramic capacitors (MLCC)

FIG. 2 shows diagrams of reduction potentials measured through cyclic voltammetry for MLCCs made according to the present invention and a prior art, where Diagram (a) thereof shows the reduction potential of a high-capacitance high-Ni-inner-electrode-density MLCC of the present invention and Diagram (b) thereof shows the reduction potential of a general low-Ni-inner-electrode-density MLCC. Obviously, the high-capacitance MLCC has a higher density of Ni inner electrodes deflected into conductors with a higher reduction potential obtained of no doubt, where the ends or sides are easy to be electrochemically deposited.

Table 1 shows the principle and method of fabricating terminal electrodes for the high-capacitance high-Ni-inner-electrode-density MLCC. Because the high-capacitance MLCC has a high density of Ni inner electrodes at the ends with high reduction potential, electrochemical deposition, including electroplating and electroless plating, can be used to fabricate terminal electrodes. The metal-plated terminal electrode obtained through electrochemical deposition can have the same material as the inner electrode, or uses a material forming into an ohmic contact with the Ni internal electrodes. The binding force between the terminal electrodes and the dielectric ceramic layers includes not only the binding force between the metal-plated terminal electrodes obtained through electrochemical deposition and the dielectric ceramic layers, but also the binding force between the high-density Ni inner electrodes of the MLCC and the metal-plated terminal electrodes obtained through electrochemical deposition.

TABLE 1

| | | Novel MLCC terminal electrode |
|---|---|---|
| Mechanism | Principle | Uniform connection (integrated) |
| | Method | Outer electrode derived from inner electrode |
| Function | Ohmic contact | Ni/Ni |
| | Brick combined | Ni outer electrode combined with Ni inner electrode |
| Material | Organic | Additive |
| | Non-organic | NiCl$_2$ solution |
| Process | Forming | Screen printing and chemical plating |
| | Heat treatment | Drying (100 degrees Celsius (° C.)) |
| Feature | Appearance | Three sides |
| | Physical feature | Low stress, high density |
| | Reliability | High thermal-cycle resistance |

Figure 3:
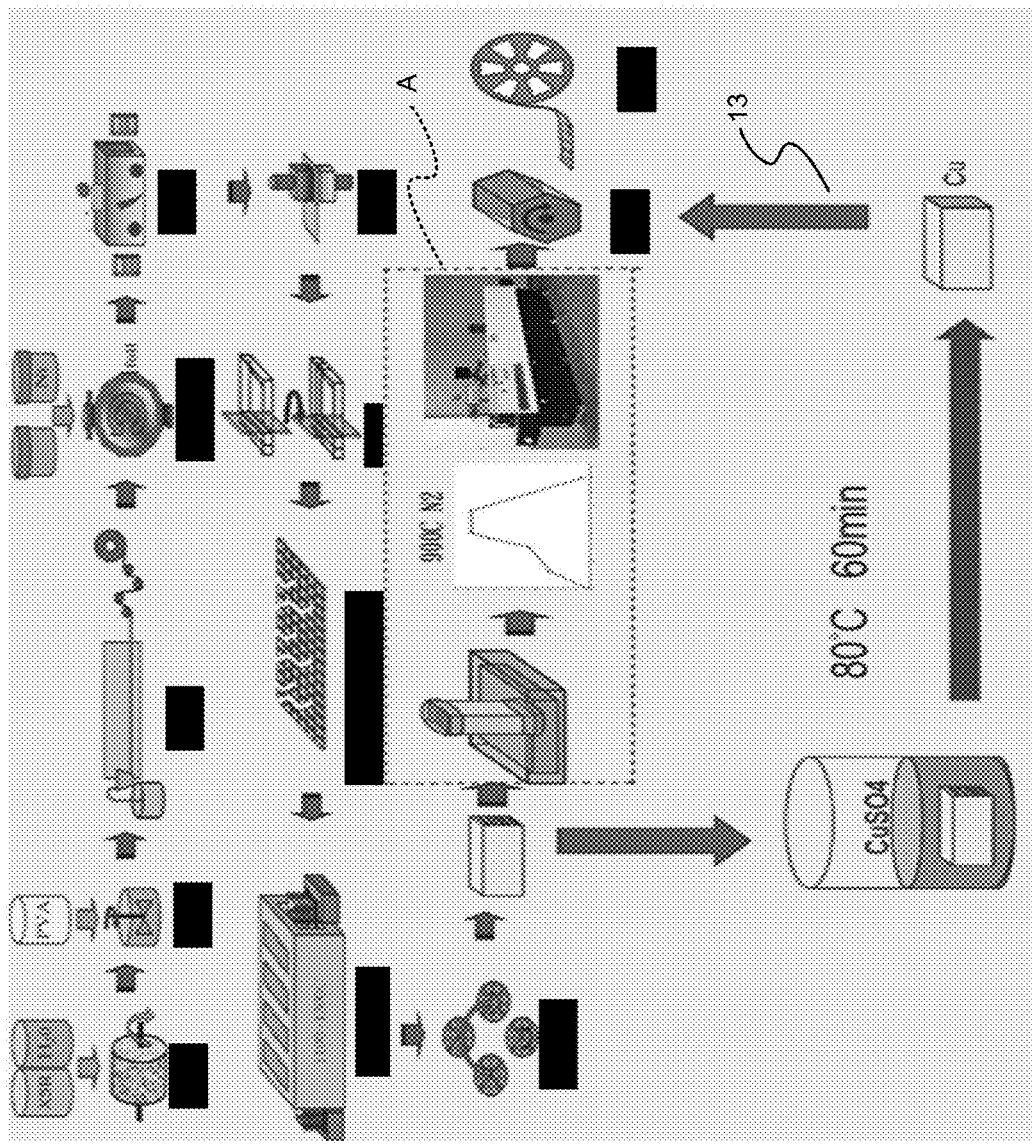
FIG. 3 is the view showing the fabrication of terminal electrode.

FIG. 3 shows the comparison of MLCC fabrications of a prior art and the present invention. Therein, the traditional fabrication uses immersion plating for thick-film Cu paste to be sintered into Cu terminal electrodes with nitrogen under a high temperature as denoted in Dashed-line A; and the present invention uses immersion for electrochemical deposition to obtain the Cu terminal electrodes 13.

Figure 4A:
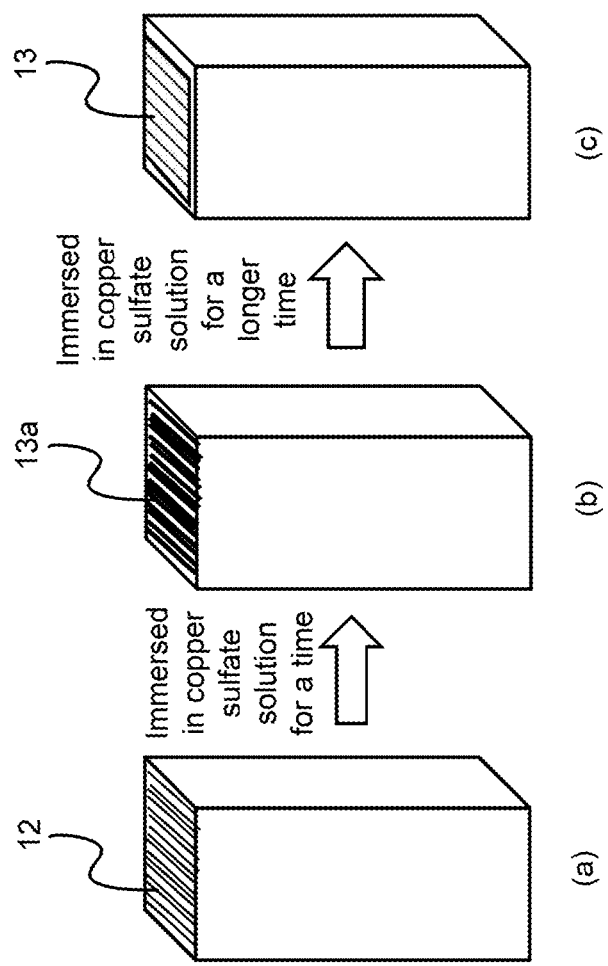
FIG. 4A is the view showing the Cu terminal electrode obtained by displacing the high-density Ni electrodes.
Figure 4B:
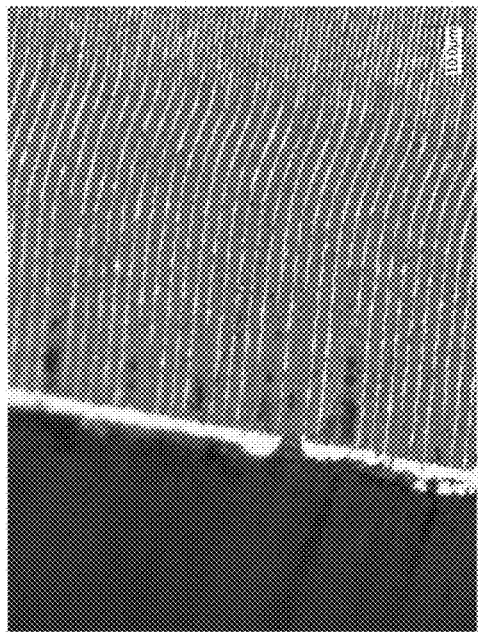
FIG. 4B is the view showing the microstructure of the Cu terminal electrode obtained after deposition.
Figure 4C:
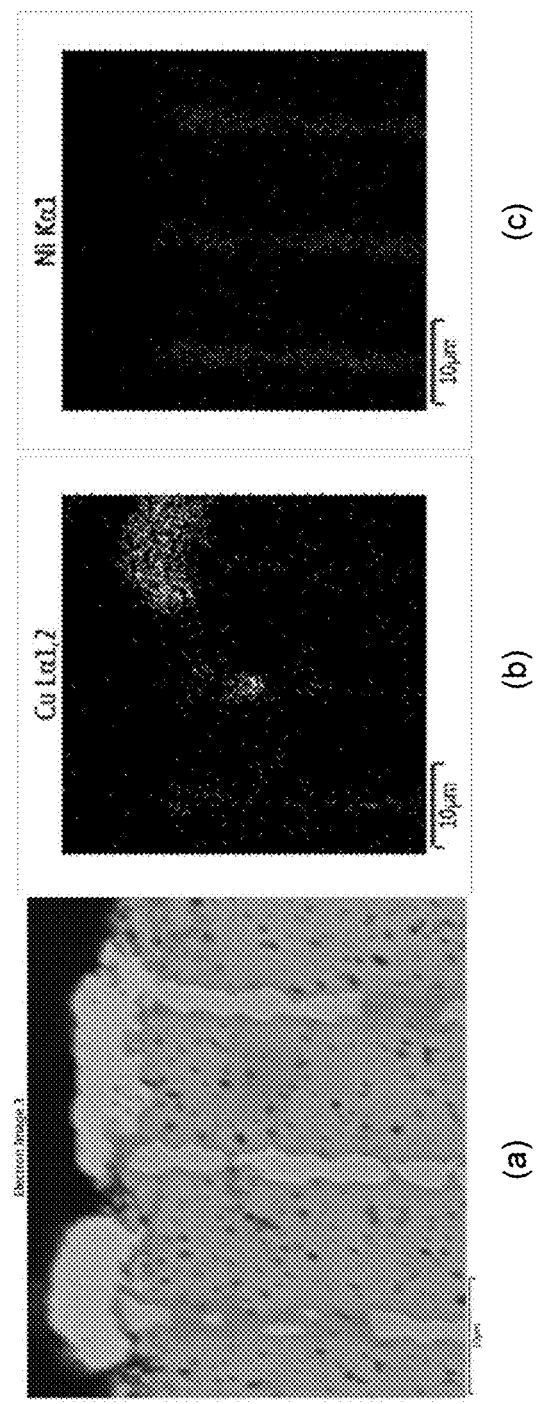
FIG. 4C is the view showing the microstructure and material of the Cu terminal electrode obtained during deposition.

FIG. 4A shows the immersion for electrochemical deposition, where Diagram (a) thereof shows high-density Ni inner electrodes 12 of an MLCC starting electrochemical deposition to slowly form Cu electrodes 13a on the surfaces of the Ni inner electrodes 12 denoted by Diagram (b) thereof; and, after a period of deposition, the Cu electrodes 13a on the surfaces of the Ni inner electrodes 12 grow continuously to be connected together to form a Cu terminal electrode 13 at an end as denoted by Diagram (c) thereof. FIG. 4B shows the microstructure of the Cu terminal electrode 13 obtained after deposition. Diagram (c) of FIG. 4A shows the complete structure of the electrochemically-deposited Cu terminal electrode photographed through optical microscope. Diagram (a) of FIG. 4C shows the microstructure of the Cu terminal electrode during the deposition, which is the microstructure of the novel Cu electrode photographed through electron microscope. Material analyses are shown in Diagram (b) and Diagram (c) of FIG. 4C, which are a material analysis of the Cu terminal electrode and a material analysis of the Ni inner electrode, respectively, and show good connections of the Cu terminal electrode and the Ni inner electrode.

The following states-of-use are only examples to understand the details and contents of the present invention, but not to limit the scope of patent of the present invention.

[State-of-Use 1: MLCC Terminal Electrode (I)]

Figure 5:
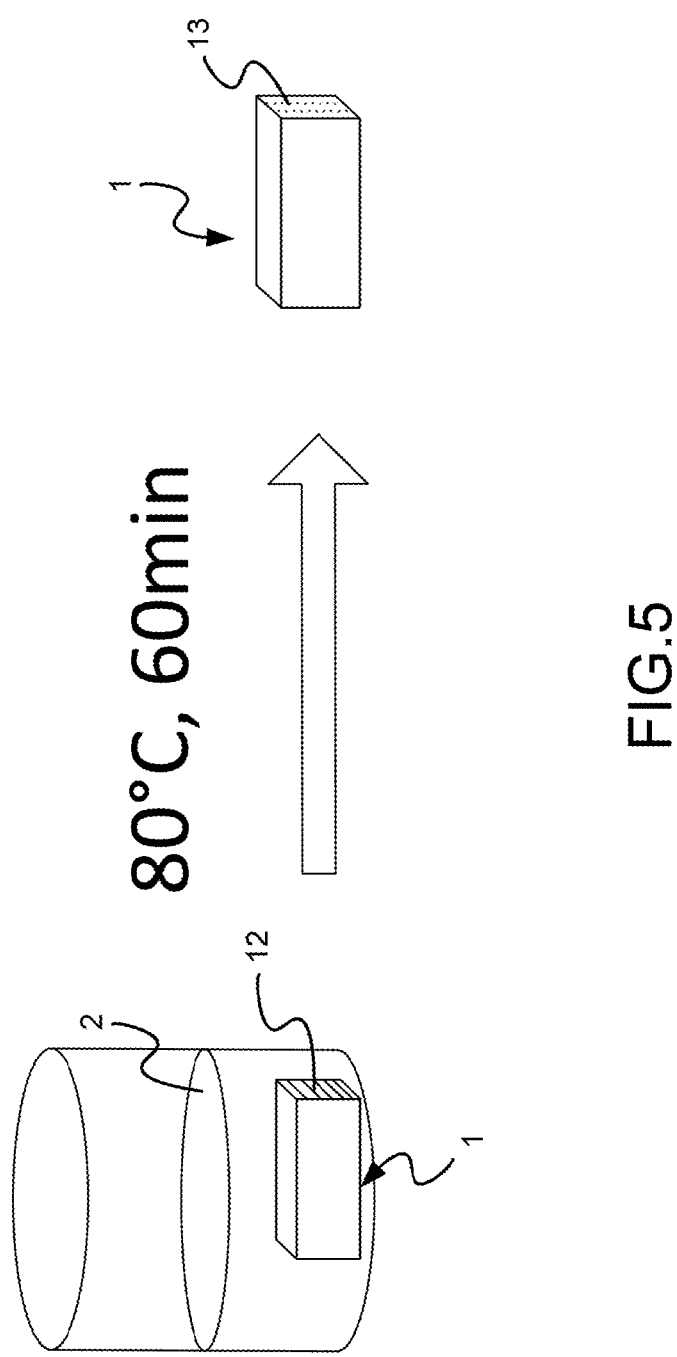
FIG. 5 is the view showing the Cu terminal electrode obtained through conversion after immersing the MLCC in the low-temperature copper sulfate solution.
Figure 6:
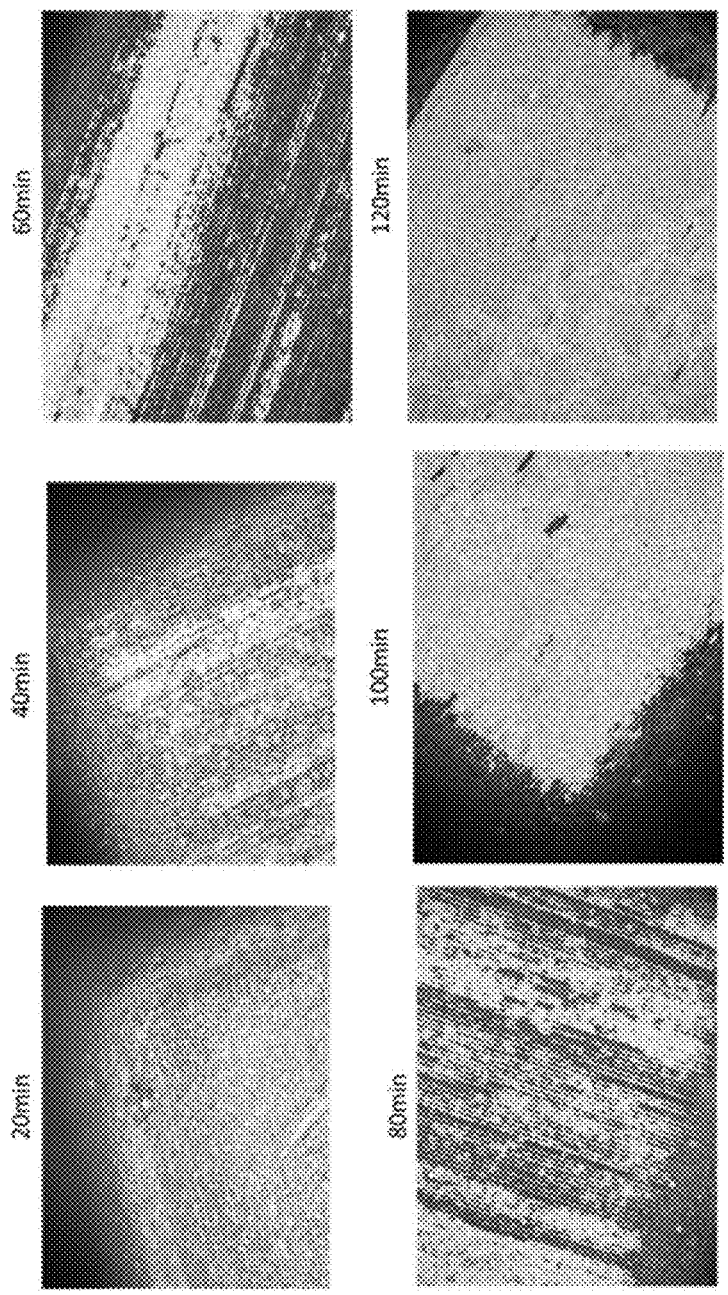
FIG. 6 is the view showing the microstructures of the Cu terminal electrode obtained through gradual conversion for the period of 20 minutes (min) to 2 hours (hrs) after immersing the MLCC in the low-temperature copper sulfate solution.

The present invention does not use copper paste and high-temperature sintering nitrogen-furnace. Instead, a sintered MLCC 1 without terminal electrode is deposited to be immersed in a copper sulfate solution 2 at a temperature of 80° C. as shown in FIG. 5. At first, the upper end of the Ni inner electrode 12 gradually grows to form Cu electrodes 13a. As time goes by, each of the Cu electrodes 13a and its neighboring ones of the Cu electrodes 13a are getting closer and closer. About 1 hour (hr) later, a Cu terminal electrode 13 is formed by connecting their surfaces. As shown in FIG. 6, the high-capacitance MLCC is immersed in the copper sulfate solution at a temperature of 80° C. for 20 min to 2 hrs. Following the continuous increase of immersion time of the copper sulfate solution, the formation of the Cu terminal electrode is becoming more and more complete on a side of the MLCC as shown in Table 2. When the immersion time is longer, the Cu terminal electrode is formed more complete and its dielectric features have changed to become closer and closer to the features of a traditional Cu terminal electrode sintered with a thick-film Cu paste along with a high-temperature nitrogen.

TABLE 2

|  | Cs | tanD | I.R. (Gohm) |
|---|---|---|---|
| 20 min | 876 nf | 0.052 | 48.9 |
| 40 min | 920 nf | 0.056 | 32.5 |
| 60 min | 3.5 uf | 0.035 | 2.81 |
| 80 min | 3.4 uf | 0.037 | 2.31 |
| 100 min | 22 uf | 0.067 | 0.15 |
| 120 min | 22.9 uf | 0.068 | 0.12 |
| Traditional thick-film Cu paste sintered at 850° C. with $N_2$ | 23.6 | 0.065 | 0.13 |

[State-of-Use 2: MLCC Terminal Electrode (II)]

Figure 7:
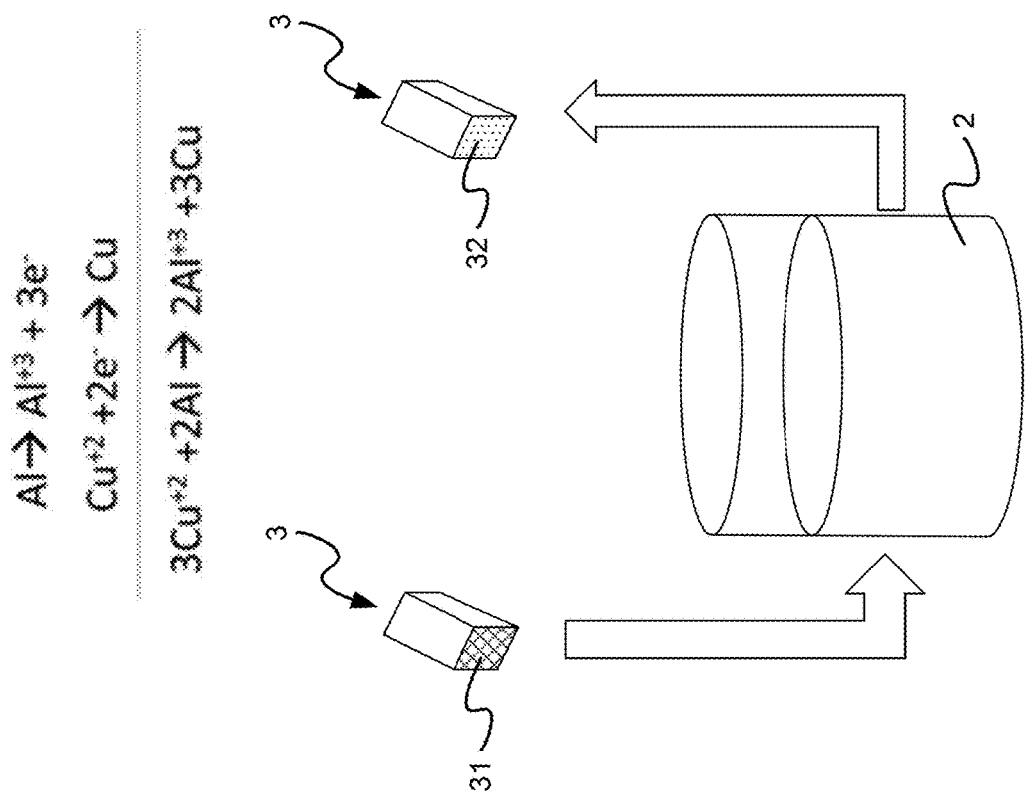
FIG. 7 is the view showing the conversion of the low-temperature Al terminal electrodes into the Cu terminal electrode through chemical redox displacement.

As shown in FIG. 7, an MLCC 3 is immersed and baked at a low temperature, where, after processing a heat treatment at a temperature below 200° C., an aluminum (Al) terminal electrode 31 are fabricated on surfaces of inner electrodes. Then, after processing plating of wet chemical immersion by immersing the Al terminal electrode 31 of the MLCC 3 in a copper sulfate solution at 60~80° C. for 10~60 min, the Al terminal electrode 31 of the MLCC 3 is processed through chemical redox displacement to be formed into a Cu terminal electrode 32 of the MLCC 3, whose capacitance features are equivalent to those of the traditional Cu terminal electrode of MLCC sintered with Cu paste along with nitrogen in a high-temperature reduction atmosphere.

[State-of-Use 3: Insulating Protective Layer of MLCC]

Figure 8:
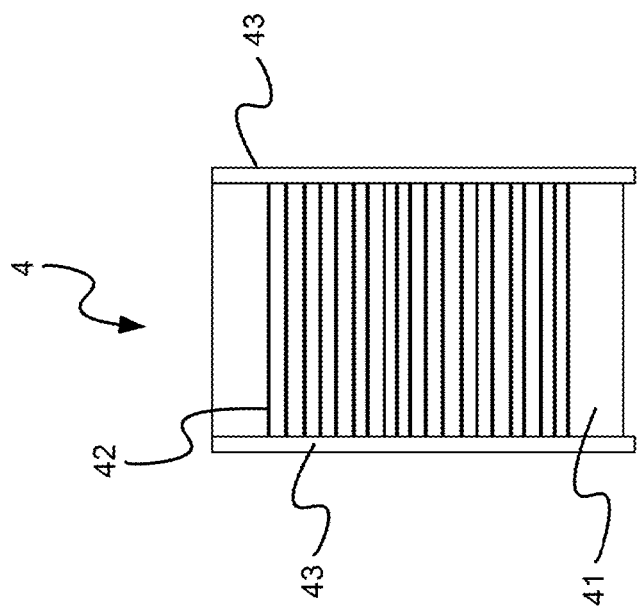
FIG. 8 is the view showing the fabrication of the insulating protective layers.
Figure 11:
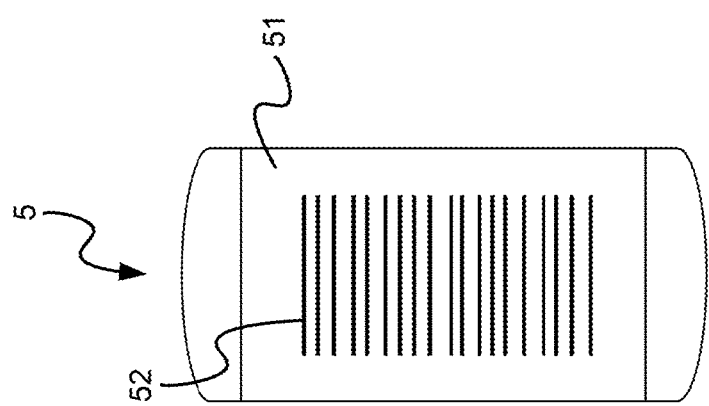
FIG. 11 is the view of the prior art.

A traditional high-capacitance MLCC 5 has a breading effect after being sintered, which is owing to the difference in density between a stack of inner electrodes 52 in the middle along with electrode-excluded dielectric ceramic layers 51 on sides, as shown in FIG. 11. The solution proposed by the present invention is to print electrodes on full area and, then, fabricate insulating protective layers 43 on sides, as shown in FIG. 8. The present invention prints the inner electrodes 42 on full area, so that there is no density difference caused by the inner electrodes 42 existed in the middle and the inner electrodes 42 excluded on sides. This approach not only obtains a high uniformity in the fabrication of the internal devices of the MLCC 4 but also maximizes the printing area, which benefits in achieving high capacitance with a large area. The only difficulty to be overcome is to make insulating protective layers on sides of the multilayer ceramic.

Figure 9:
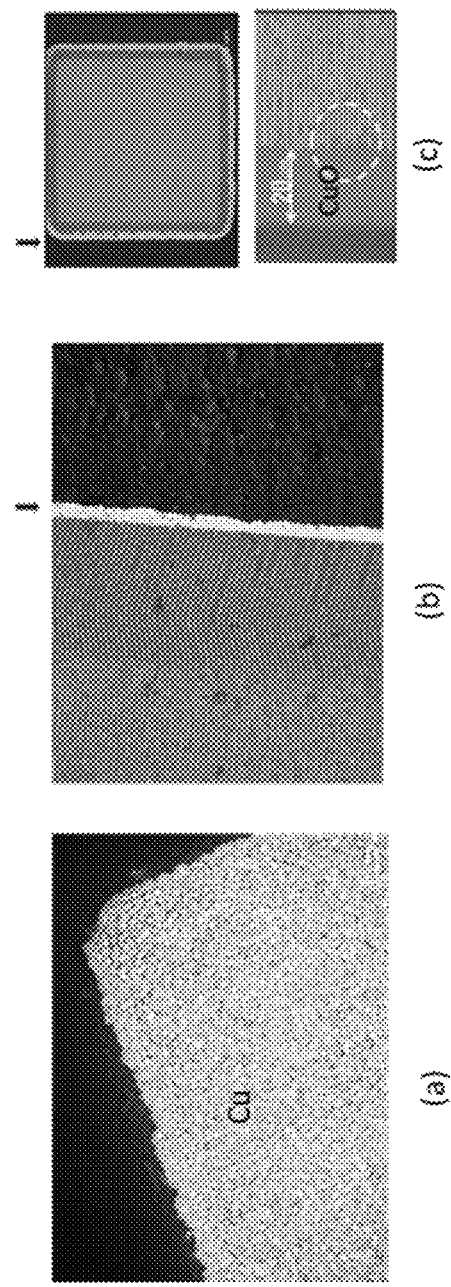
FIG. 9 is the view showing the microstructure of the novel MLCC.
Figure 10:
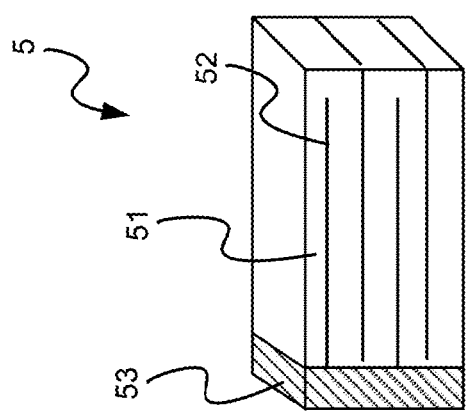
FIG. 10 is the view of the low-density Ni inner electrodes at ends and sides.

FIG. 9 shows the same operation for the insulating protective layers as is for the high-capacitance Cu terminal electrode. After immersing a multilayer ceramic in a copper sulfate solution at a temperature of 80° C. for 1 hr, Cu electrodes are grown on sides as shown in Diagram (a) and Diagram (b) of FIG. 9. Then, after being baked in the air at a low temperature of 250° C. for half an hour, the copper electrodes on sides are oxidized into insulating protective layers of copper oxide as shown in Diagram (c) of FIG. 9, where the conductivity of the Ni inner electrodes are not affected. Thus, a high-capacitance MLCC is fabricated with full area printed yet breading effect excluded.

Hence, the main technical features of the present invention are as follows:

The area ratio of the inner electrodes to the dielectric ceramic layers is greater than 1:50, where not only the conductivity of the side surfaces of the dielectric ceramic layers is increased but also continuous terminal electrodes on sides are formed.

The plating of wet chemical immersion is achieved through metal plating or metal chemical plating; and the metal chemical plating comprises metal-displacing chemical plating.

Therein, the chemical plating and the inner electrodes of the MLCC use Cu metal or an alloy thereof, where a good ohmic contact is formed for connection with inner electrodes.

The binding force between the metal-plated terminal electrodes and the dielectric ceramic layers comprises not only the binding force between the metal coating and the dielectric ceramic layers, but also the binding force between the inner electrodes and the metal coating.

The metal coating formed on the sides through chemical immersion is processed through a proper heat treatment to be converted into a metal oxide to be insulating protective layers.

Furthermore, the key technical features of the present invention are different from prior arts in the following:
1. The present invention does not require a thick-film conductive paste and sintering electrodes in a protective atmosphere at a high temperature. At a low temperature, a terminal electrode is fabricated for a high-capacitance MLCC with an ultra-low internal stress as comprising thinned dielectric layers and inner electrodes.

2. The present invention fabricates insulating protective layers on sides through a heat treatment in the air under an especially low temperature (<300° C.). A novel fabrication is obtained, where the binding force of the MLCC mainly comes from the binding force between the inner electrodes and the insulating protective layers. Because it is a low-temperature fabrication, there is no need for printing together with heat treatment of high-temperature reduction. The fabrication is simple and the quality of the insulating protective layers is optimized.

Accordingly, the present invention is suitable for passive devices. The commercial applications may include those for replacing related precious-metal electrodes with Cu electrodes, like MLCC-terminal-electrode passive device and ultra-low-resistance chip resistor.

To sum up, the present invention is a method for fabricating a terminal electrode of an MLCC having inner electrodes printed on full area together with protective layers, where the present invention uses a coating technology of ultra-low-temperature electrochemical deposition to fabricate low internal-stress MLCC terminal electrodes and insulating protective layers for improving MLCC yield with cost reduced.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for fabricating a terminal electrode of a multilayer ceramic capacitor (MLCC) having inner electrodes together with protective layers comprising steps of:
   inter-stacking a plurality of thinned dielectric ceramic layers and a plurality of inner electrodes, and printing said inner electrodes on a full area of a MLCC with an area density ratio of said inner electrodes to the dielectric ceramic layers of greater than 1 to 50 at ends and sides of said MLCC;
   immersing said MLCC in a metal solution at a temperature below 80 degrees Celsius (° C.), to, through electrochemical deposition, plate a metal coating on surfaces of said inner electrodes; and
   growing said metal coating on said surfaces of said inner electrodes for 1 to 2 hours to be continuously connected together to obtain a metal-plated terminal electrode with a continuously connected surface at said ends of said MLCC.

2. The method according to claim 1, wherein said plating comprises metal-displacing chemical plating.

3. The method according to claim 1, wherein said metal-plated terminal electrode obtained through said electrochemical deposition is made of a material selected from a group consisting of the same material of said inner electrode; and an alloy formed into an ohmic contact with said inner electrode.

4. The method according to claim 1, wherein said metal-plated terminal electrode is a copper (Cu) terminal electrode.

5. The method according to claim 1, wherein said metal solution is a solution of copper sulfate.

6. The method according to claim 1, further comprising
   (d) oxidizing said metal-plated terminal electrode at said ends of said MLCC through a low-temperature heat treatment at a temperature of 200 to 300° C. to obtain insulating protective layers of a metal oxide.

7. The method according to claim 1, wherein a binding force between said metal-coated terminal electrode and said dielectric ceramic layers comprises a binding force between said metal-coated terminal electrode and said dielectric ceramic layers, and a binding force between said inner electrodes and said metal-coated terminal electrode.

* * * * *